UNITED STATES PATENT OFFICE.

WILLIAM E. BRADLEY, OF FRANKFORT, KENTUCKY.

PROCESS OF MAKING WHISKY.

SPECIFICATION forming part of Letters Patent No. 481,925, dated September 6, 1892.

Application filed July 9, 1889. Serial No. 316,973. (No specimens.)

*To all whom it may concern:*

Be it known that I, WILLIAM E. BRADLEY, of Frankfort, Franklin county, Kentucky, have invented a new and useful Improvement in the Process of Making Whisky, of which the following is a full, true, and exact description.

It has been found advantageous in certain processes of whisky-making or yeast-making to use in subsequent repetition of the processes the thin clear slop-liquor from which the particles have settled. The ordinary method of carrying on this process has been to permit the slop to stand in the settling-tubs after it has been blown out from the still for a sufficient length of time to insure the deposit of the heavier particles in these tubs. It is obvious that during this period of settling the slop has been exposed to the injurious ferments of the air. I have discovered a method by which the thin portion of the slop can be cleared by settling and returned without the resulting deleterious effects from such atmospheric exposure. The beer in the process of fermentation in the latter stages settles quite clear on the top. I propose, therefore, to run off the thin beer which has cleared itself in the top of the fermenters, separately distill the same, and use this thin slop in subsequent repetition of the process of whisky-making. I prefer to rapidly cool this slop as soon as it issues from the still, and this is most important when the slop is to be stored for any suitable length of time before being used. It is obvious that by this method the slop is not exposed to the action of such deleterious ferments while gradually cooling, as in the old process; but the necessary settling of the beer at the end of fermentation is utilized to effect this separation.

In practice at the end of the fermenting period I draw off from the top of the fermenter so much clear beer as I may desire to use back as slop. I separately distill the same, and by preference rapidly cool it through any form of cooler to a temperature which should be below 80°, and then use back this slop in filling up the fermenter and washing out the mash-tub, and wherever such slop can be used in place of water. I prefer to wait until the very end of the fermenting period before drawing off this thin beer, as during the earlier period, while the carbonic-acid gas is rising, the beer will contain certain small particles, which in the process herein claimed it is not my purpose to return, the utilizing of said discriminating separating action of the carbonic acid in the beer being the subject of a separate application filed by me on the 25th day of June, 1889, Serial No. 315,520.

What I claim as my invention, and desire to secure by Letters Patent, is—

1. The process herein described of drawing off thin beer from the top of the fermenter at the end of the fermenting period and before distillation, separately distilling the same, and using the slop from this separated beer in subsequent repetition of the process of whisky-making, substantially as described.

2. The process herein described of drawing off thin beer from the top of the fermenter at the end of the fermenting period and before distillation, separately distilling the same, rapidly cooling the slop, and using the slop from this separated beer in subsequent repetition of the process of whisky-making, substantially as described.

In testimony whereof I have signed my name to this specification in the presence of two subscribing witnesses.

WILLIAM E. BRADLEY.

Witnesses:
　IRA S. SHY.
　J. P. ROCHE.